United States Patent [19]

Weatherford et al.

[11] Patent Number: 4,760,522
[45] Date of Patent: Jul. 26, 1988

[54] INTERMIXING OF DIFFERENT CAPACITY MEMORY ARRAY UNITS IN A COMPUTER

[76] Inventors: James R. Weatherford, 5500 Knights Ct., Lake Dallas, Tex. 75065; Arthur T. Kimmel, 4322 Windward Cir., Dallas, Tex. 75252

[21] Appl. No.: 107,841

[22] Filed: Oct. 1, 1987

Related U.S. Application Data

[63] Continuation of Ser. No. 622,458, Jun. 20, 1984, abandoned.

[51] Int. Cl.$^4$ .............................................. G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,914,747 | 10/1975 | Barnes et al. | 364/200 |
| 3,940,743 | 2/1976 | Fitzgerald | 364/200 |
| 4,037,215 | 7/1977 | Birney et al. | 364/200 |
| 4,234,934 | 11/1980 | Thorsrud | 364/900 |
| 4,293,910 | 10/1981 | Flusche et al. | 364/200 |
| 4,488,256 | 12/1984 | Zolnowsky et al. | 364/900 |

Primary Examiner—Gary V. Harkcom
Assistant Examiner—Randy W. Lacasse
Attorney, Agent, or Firm—Richards, Harris, Medlock & Andrews

[57] ABSTRACT

A memory array unit (20) is used within a main memory (26) of a computer system (10). The memory (26) comprises a plurality of memory array units (20, 22, 24) and each of the memory array units (20, 22, 24) has an allocated address range of 0 to 16 megabytes. However, the memory array unit (20) has a capacity of only four megabytes. The usable address range is 0 to 2 megabytes and 8 to 10 megabytes. The remainder of the address range is a null. Upon development of an increased memory array unit (20) having a greater capacity, such as 16 megabytes, the new memory array unit (20) is directly substituted for the previous low capacity memory array unit. The new memory array unit (20) has a fully implemented address range from 0 to 16 megabytes. The low and high capacity memory array units can be intermixed or the low capacity units can be entirely replaced by the high capacity units without the need for modifying any of the computer system (10) or for modifying the system software.

3 Claims, 1 Drawing Sheet

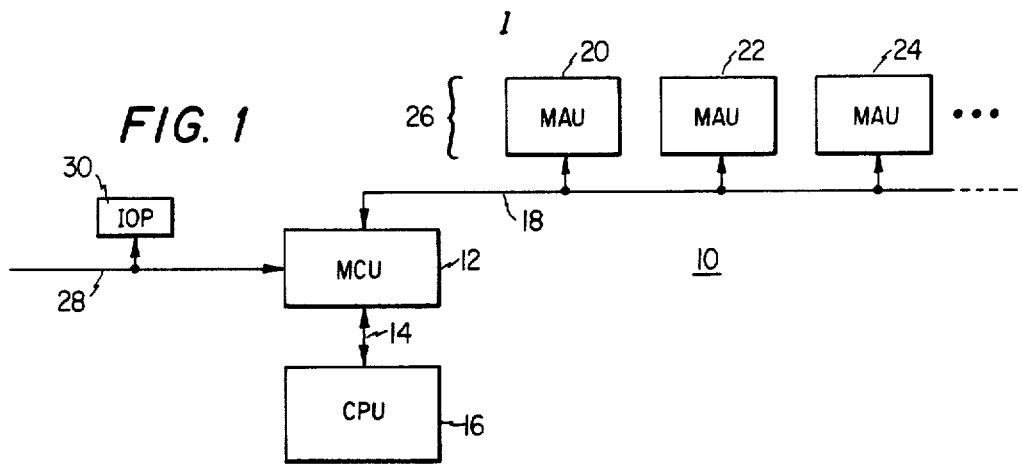
FIG. 1
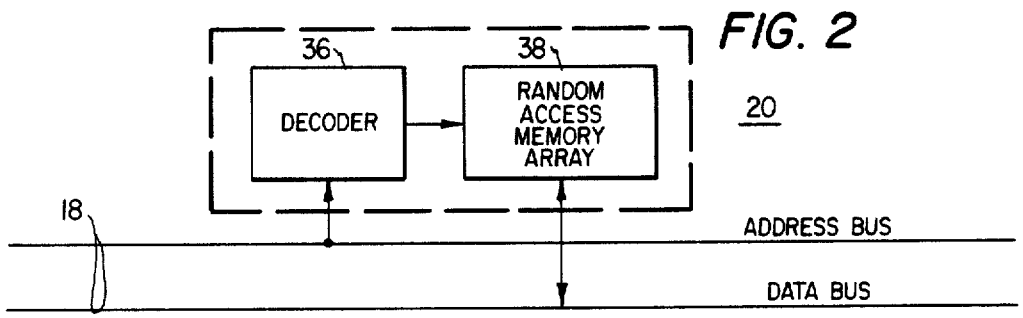
FIG. 2
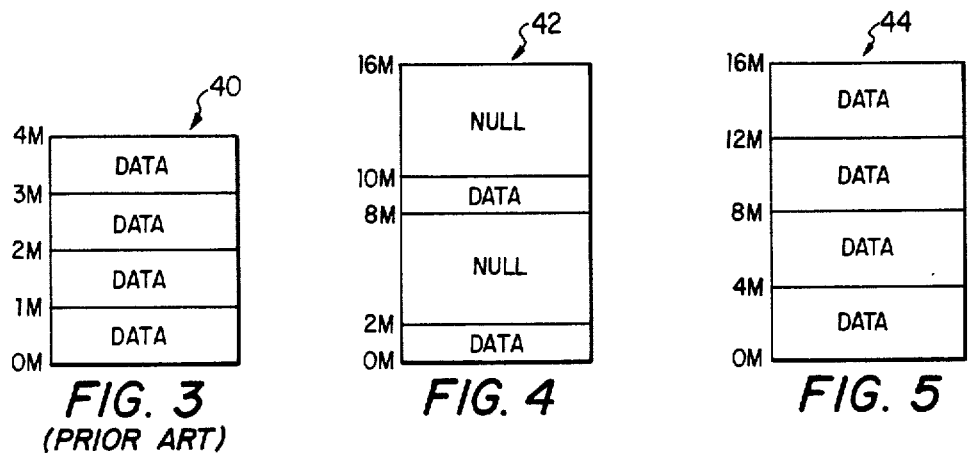
FIG. 3 (PRIOR ART)
FIG. 4
FIG. 5

INTERMIXING OF DIFFERENT CAPACITY MEMORY ARRAY UNITS IN A COMPUTER

This application is a continuation of application Ser. No. 622,458, filed 6/20/84 now abandoned.

TECHNICAL FIELD

The present invention pertains in general to computer technology and in particular to the use of a plurality of memory array units to form a main memory in a computer.

BACKGROUND ART

It has heretofore been a conventional practice to build a computer main memory by use of a plurality of memory units. The address for a particular location in the main memory includes a section that designates the particular unit and a further portion that designates a particular storage location on the card for the unit.

A typical memory card comprises an array of memory chips which are typically dynamic random access memory circuits. Dynamic access memory chips have undergone a steady progression in capacity through the years. During each period of several years the capacity of memory chips typically increases by a factor of four. Although a memory system designer is aware that greater capacity memory chips may be available in the future, the designer must finalize his design with a selected type of memory chip. The overall system must then be designed to operate with the selected memory chip.

The demand for greater memory capacity in computer systems appears to be insatiable. When new memory chips become available at competitive prices it is often the desire of computer system users to upgrade the capacity of their systems by using the new chips even though the existing system was designed around the previous generation of memory chip. To incorporate the increased memory it is necessary to not only replace all of the existing memory cards but to substantially redesign the memory control unit of the computer and possibly the central processor to accommodate the increased capacity and the new distribution of memory capacity on the improved memory cards. The requirement to not only replace all of the memory cards but also to redesign a substantial part of the system can entail substantial costs as well as possible loss of operating time for the system.

In view of the above problems and the anticipated requirement for increasing the memory size of computer systems, there exists a need for a design for a memory which can permit the intermixing of different capacity memory units within a main memory or the total changeover to greater capacity memory cards without the need for system redesign and hardware replacement.

SUMMARY OF THE INVENTION

A selected embodiment of the present invention comprises a memory array unit for use in a computer which has a main memory made up of a plurality of memory array units wherein the memory array units have an allocated address range and communicate through a memory bus. The memory array unit includes a random access memory array connected to exchange operands through the memory bus wherein the memory array has a memory capacity less than the allocated address range for the memory array unit. The memory array unit further includes a decoder for receiving addresses from the memory bus for selecting corresponding operand locations in the memory array. The decoder is responsive to only a subset of the addresses within the allocated address range. The subset of addresses encompasses an address range equal to the capacity of the memory array.

BRIEF DESCRIPTION OF THE DRAWINGS

For a more complete understanding of the present invention and the advantages thereof, reference is now made to the following Description taken in conjunction with the accompanying Drawings in which:

FIG. 1 is a block diagram of a computer system which includes a memory control unit, a central processing unit and a main memory comprising a plurality of memory array units;

FIG. 2 is a block diagram illustrating the configuration of a memory array unit as shown in FIG. 1;

FIG. 3 is an illustration of the address range and allocation for a conventional memory array unit;

FIG. 4 is an illustration of the memory address allocation and range for a memory array unit in accordance with the present invention; and FIG. 5 is an illustration of the memory address allocation and range for a memory array unit for use in conjunction with a memory array unit having the memory address shown in FIG. 4.

DETAILED DESCRIPTION

The present invention provides a design for a memory array unit for use in a computer system so that the system can be upgraded to a larger capacity memory. The upgrade can be done by either replacing individual memory cards or a complete replacement of all the memory array units.

Referring to FIG. 1 there is shown a schematic illustration of a computer system 10. The system 10 includes a memory control unit 12 which communicates through a bus 14 to a central processor unit 16. The memory control unit 12 further communicates through a memory bus 18 to a plurality of memory array units 20, 22 and 24. There may be a greater number of memory array units connected to the memory bus 18. The memory array units, including units 20, 22 and 24 comprise a main memory 26 for the computer system 10. The system 10 further includes a peripheral bus 28 which provides communication to one or more input output processors, such as 30.

The computer system 10 typically operates by retrieving instructions and operands from the main memory 26 and transferring these to the central processor unit 16 for execution of the operands. The operands subsequently produced are returned through the memory control unit 12 to either the peripheral bus 28 for delivery to various input/output processors, such as 30, or through the memory bus 18 for storage in the main memory 26. In many applications it is desirable to have the greatest possible storage capacity for the main memory 26 which can be obtained at a reasonable cost. With advances in technology and production, the cost per bit of memory storage has been decreasing rapidly. It is therefore often desirable to replace the memory array units, such as 20, 22 and 24 with new units having substantially increased capacity. This has heretofore been an expensive and time consuming task since it usually requires redesign and replacement of the memory control unit 12 to accommodate the increased memory capacity and distribution of memory capacity between the new memory array units. By use of the present invention it is possible to replace one or more of the memory array units 20, 22, 24 with no change in the memory control unit 12 or even any change to the software operating system for the computer system 10.

Referring now to FIG. 2 there is shown a block diagram of the memory array unit 20 illustrated in FIG. 1. The unit 20 receives addresses from the bus 18 and the addresses are provided to a decoder 36. The unit 20 further includes a random access memory array 38 which is connected to transmit and receive data through the bus 18. The decoder 36 operates in conjunction with the random access memory array 38 to select locations within the array 38 for either reading data for transmission to the bus 18 or writing data from the bus 18 into the array 38.

The address field used by the memory control unit 12 has one portion for selecting which of the memory array units, such as 20, 22 and 24 are to be selected. A further portion of the address field comprises a range of addresses that are allocated and are the same for all of the memory array units 20, 22 and 24. This allocated range determines the selected memory location within the array 38.

A conventional allocation of memory addresses, as practiced in the prior art, is shown in FIG. 3. An address allocation 40 has a range of 4 megabytes with 4 data sections completely filling the entire range. This is the address allocation for one memory array unit, such as 20 shown in FIG. 1. This memory allocation range for one memory array unit works well in the initial design of a computer system but does not provide any flexibility to accommodate upgrading to increased capacity.

Referring now to FIG. 4 there is illustrated the address allocation for a memory array unit in accordance with the present invention. An address allocation 42 has a full address range of 16 megabytes. However, the actual capacity of the corresponding memory array unit is only 4 megabytes. The addresses for the implemented 4 megabytes are in a subset of the full allocated address range. In the illustrated embodiment these comprise first and second address ranges. The first address range is from 0 to 2 megabytes and the second address range is from 8 to 10 megabytes. The address ranges from 2 to 8 megabytes and from 10 to 16 megabytes are nulls. The decoder 36 is designed to recognize only the addresses in the subset address ranges of 0 to 2 megabytes and 8 to 10 megabytes. Addresses that are within the nulls are ignored by the decoder 36.

The decoder 36 can be designed to recognize any desired group of addresses and the designing of such a decoder is shown in the application notes for a model 74F138 1 of 8 decoder a selected embodiment of the decoder 36.

In operation, the computer system 10 executes a preliminary routine which interrogates the main memory 26 through the entire range of possible addresses. In doing so it determines which address ranges are valid and which address ranges are not valid, that is, null. This is stored and used by the operating system such that the application programs use only the valid ranges. In such a technique the application program is completely independent of which addresses and address ranges are physically available. Therefore, when any change is made in the size of memory, this is immediately accommodated without any need to modify the operating system or application programs.

Referring now to FIG. 5 there is illustrated an address allocation 44 for a memory array unit having an increased memory capacity over the memory array unit corresponding to the address allocation shown in FIG. 4. A memory array unit corresponding to the address allocation shown in 44 has a memory capacity of 16 megabytes. Data can be stored at any address between 0 and 16 megabytes on the memory array unit. The new memory array unit, corresponding to allocation 44, can be directly substituted for one of the memory array units which correspond to allocation 42. When the system 10 is initialized it discovers that a full allocation of the available address range is available and this information is stored in the operating system such that the full memory capacity is available to the application program.

The low capacity memory array units, corresponding to allocation 42, in the main memory 26 can be intermixed in any fashion with the high capacity memory array units, corresponding to allocation 44, or all high capacity memory array units can be installed in the memory 26. In either case the increase in memory capacity is accomplished without making any changes to the memory control unit 12 or altering the operating system or application programs.

Although the memory allocation range 42 shown in FIG. 4 has two address subsets which are the same size and spaced equally apart, there may be other arrangements of address subsets. One example is placing all the available data from 0 to 4 megabytes and making the remaining addresses null from 4 to 16 megabytes. Other configurations are also possible.

Although one embodiment of the invention has been illustrated in the accompanying Drawings and described in the foregoing Detailed Description, it will be understood that the invention is not limited to the embodiment disclosed, but is capable of numerous rearrangements, modifications and substitutions of parts and elements without departing from the scope of the invention.

We claim:

1. A memory array unit for use in a computer which has a main memory made up of a plurality of memory array units wherein said computer has a gross address range and each of the memory array units has an allocated address range within said gross address range and communicates through a memory bus, the memory array unit comprising:

a random access memory array connected to exchange operands through said memory bus, said array having a memory capacity less than the allocated address range for said memory array unit, and a decoder for receiving addresses from said memory bus for selecting corresponding operand locations in said memory array, said decoder responsive to only a subset of addresses within said memory array unit allocated address range, the addresses in said subset and the addresses in said memory array unit address range having the same bit size wherein said subset of addresses may include any portion of said address range, said subset of addresses encompassing an address range equal to the capacity of said memory array.

2. A memory array unit as recited in claim 1 wherein said subset of addresses comprises at least first and second equal size address ranges having noncontiguous addresses.

3. A memory array unit as recited in claim 2 wherein said first address range is 0 to 2 megabytes and said second address range is 8 to 10 megabytes, said first and second address ranges within an allocated address range of 0 to 16 megabytes.

* * * * *